United States Patent
O'Leary

(10) Patent No.: US 7,982,338 B2
(45) Date of Patent: Jul. 19, 2011

(54) CONTINUOUS POWER SUPPLY CONTROL SYSTEM AND METHOD

(75) Inventor: Raymond P. O'Leary, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 284 days.

(21) Appl. No.: 11/345,933

(22) Filed: Feb. 1, 2006

(65) Prior Publication Data

US 2006/0220462 A1   Oct. 5, 2006

Related U.S. Application Data

(60) Provisional application No. 60/656,261, filed on Feb. 28, 2005.

(51) Int. Cl.
*H02J 9/00* (2006.01)
(52) U.S. Cl. .......................................................... 307/64
(58) Field of Classification Search .................. 307/64
See application file for complete search history.

(56) References Cited

U.S. PATENT DOCUMENTS

| | | | |
|---|---|---|---|
| 2003/0062775 A1* | 4/2003 | Sinha | 307/68 |
| 2003/0067285 A1* | 4/2003 | Kehrli et al. | 323/207 |
| 2004/0064272 A1* | 4/2004 | Ennis et al. | 702/57 |
| 2004/0066201 A1* | 4/2004 | Ennis et al. | 324/522 |
| 2005/0012395 A1* | 1/2005 | Eckroad et al. | 307/44 |

OTHER PUBLICATIONS

Garcia et al., Time Domain Modeling and Analysis of a Coupled DVR-STATCOM (UPFC) System, Jun. 2002, 14th PSCC, Sevilla, Session 26, Paper 2, pp. 1-7.*

* cited by examiner

*Primary Examiner* — Jared J Fureman
*Assistant Examiner* — Daniel Cavallari

(57) ABSTRACT

A control system and method of controlling an uninterruptible power supply (UPS) system prevents a load anomaly, such as transformer DC offset, resulting from a supply disruption, such as a voltage sag, by modifying the UPS supplied power curve. The UPS supplied power curve maintains a predetermined power for a predetermined duration to cause the UPS supplied power curve to depart from normal supply curve post sag detection. Following the predetermined duration, the UPS supplied power curve is conformed to the normal power supply curve until restoration of the source power supply or engagement of a secondary power source.

6 Claims, 2 Drawing Sheets

CONTINUOUS POWER SUPPLY CONTROL SYSTEM AND METHOD

This application claims the benefit of U.S. Provisional Application No. 60/656,261 filed Feb. 28, 2005.

TECHNICAL FIELD

This patent relates to the field of continuous power supply systems or devices, frequently referred to as uninterrupted or uninterruptible power supply (UPS) systems or devices, and more particularly, this patent relates to a system and method for controlling a UPS system to compensate for power supply anomalies resulting from a source disruption.

BACKGROUND

The increased use of computers and other sensitive electric devices has resulted in the proliferation of electrical loads that cannot tolerate power quality problems such as voltage sags and swells, momentary interruptions, and frequency excursions. Computer processing and data centers are not the only facilities susceptible to these power quality problems, manufacturers, laboratories and process industries are affected as well.

Voltage sags and momentary interruptions are the most commonly encountered power quality problem. An uninterruptible power supply (UPS) has the ability to protect sensitive loads from these power quality problems. For longer term power quality problems, such as outages exceeding 30 to 60 seconds in duration, back-up generator systems may be integrated with a UPS system. The UPS system responds immediately to the power quality problem and provides the time necessary to bring a back-up generator system on-line to provide longer term supplemental power.

The UPS system should seamlessly integrate with the utility power source and operate transparently to the sensitive load equipment. In a typical UPS operation, the utility source may be in a voltage sagged condition for some period before the sag is detected and the UPS output ramps up to normal output. During this period, the flux in downstream transformers may develop a direct current (DC) offset. The DC offset of the flux generally drives the downstream transformers into saturation during the first loop (and to a lesser degree, subsequent loops) of a polarity opposite that of the loop in which the sag occurred. The magnetizing current requirement during the saturation period is quite large, and presents a challenge for the UPS.

DETAILED DESCRIPTION

A control system and method of controlling an uninterruptible power supply (UPS) system prevents load anomalies, such as DC transformer offset and resulting transformer saturation, resulting from a supply disruption, such as a voltage sag, by modifying the UPS supplied power curve. The UPS supplied power curve maintains a predetermined power for a predetermined duration to cause the UPS supplied power curve to depart from normal supply curve post sag detection. Following the predetermined duration, the UPS supplied power curve is conformed to the normal power supply curve until restoration of the source power supply or engagement of a secondary power source.

Figure 1:
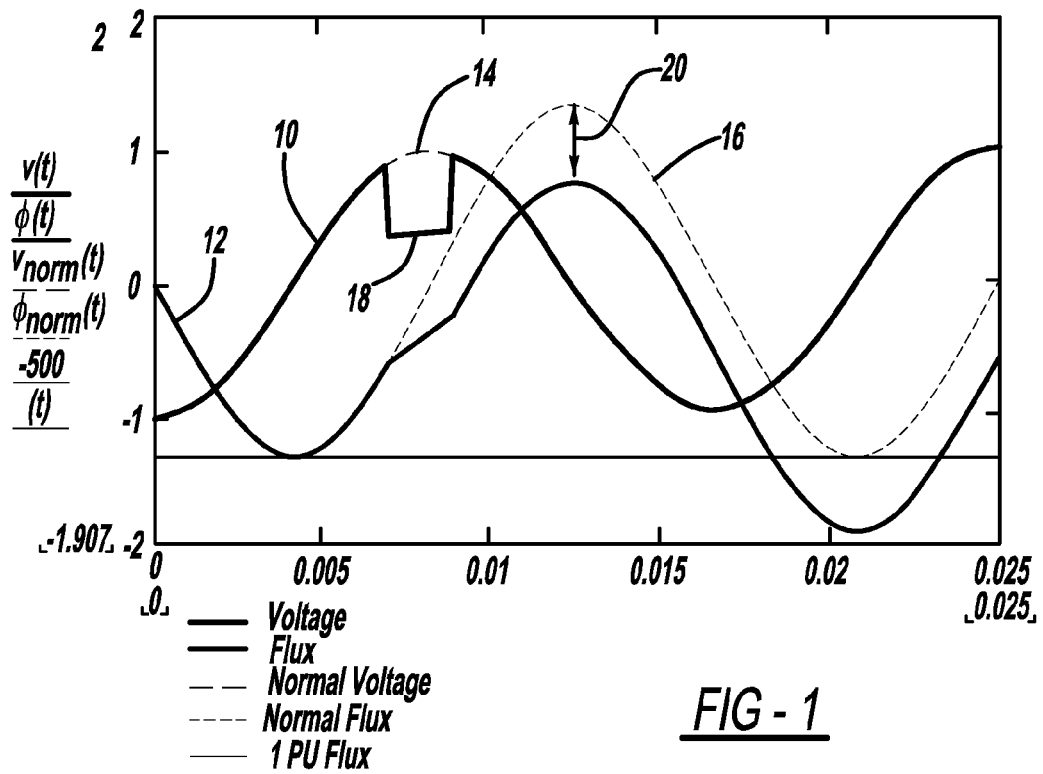
FIG. 1 is a graph depicting supply voltage and corresponding transformer flux in response to a voltage sag and compensation by a prior art UPS system.

FIG. 1 depicts a voltage curve 10 and a corresponding transformer flux curve 12 as well as a normal voltage profile 14 and a normal flux profile 16. A source power supply disruption, for example as illustrated in FIG. 1, a voltage sag 18 of duration 2 milliseconds (ms) and magnitude of about 40 percent of the supply voltage, occurs at about 7 ms. During the disruption an anomaly develops in a supplied load, e.g., the flux in downstream transformers (not depicted) develops a direct current (DC) offset 20. The DC offset of the flux generally drives the downstream transformers into saturation during the first loop (and to a lesser degree, subsequent loops) of a polarity opposite that of the loop in which the sag occurred. As depicted in FIG. 1, the sag occurring at about 7 ms causes the DC offset 20, which in turn drives downstream transformers into saturation at about 18 ms. The magnetizing current requirement during the saturation period, extending from about 18 ms to about 23 ms, is quite large, and may exceed the capability of the UPS to compensate.

Figure 2:
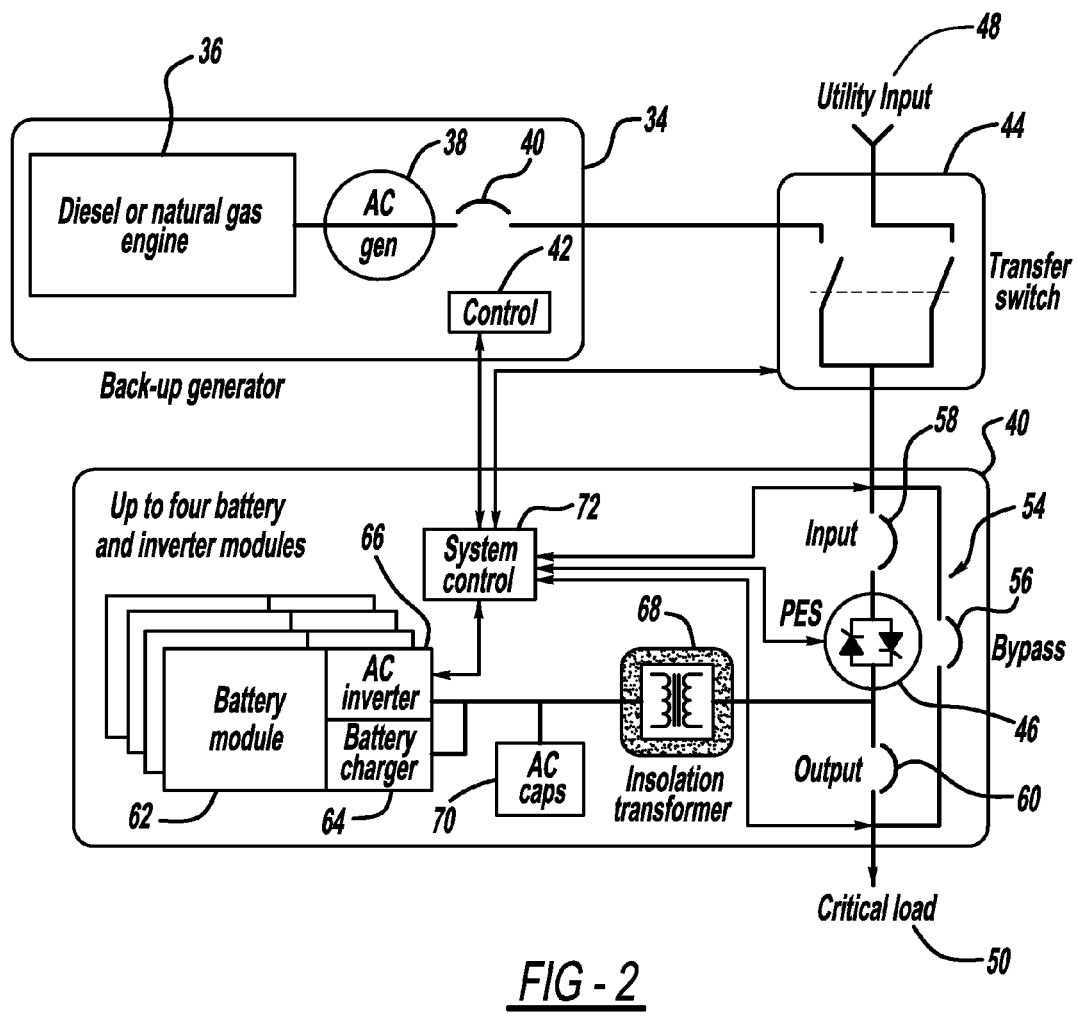
FIG. 2 is a block diagram of an uninterruptible power supply in accordance with a preferred embodiment of the invention.

FIG. 2 depicts a UPS 40 in accordance with a preferred embodiment of the invention. In addition to the UPS 40, FIG. 2 depicts an optional backup generation system 34, which may include a diesel or natural gas powered engine 36, an alternating current generator 38, switchgear 40 and controller 42, and a transfer switch 44. The UPS 40 may be based upon a PureWave UPS System commercially available from S & C Electric Company, Chicago, Ill. The UPS 40 may include a power-electronic switch (PES) 46 coupling utility source power 48 to the load 50. The PES 46 may consist of a number of pairs or modules of silicon controlled rectifiers 52. The number of modules will depend on the system rating and operating voltage of the UPS 40. The PES 46 is capable of quickly, e.g., in less than ¼ cycle, upon detection of a source power disturbance, transferring the load to the standby power source provided by the UPS 40.

The UPS 40 may further include switchgear 54 including switches 56, 58 and 60. The bypass switch 56 is configured to allow source power to flow directly to the critical load 50 when the PES 46 is out of service. The input switch 58 may be fuse rated to protect the PES 46 in a standby ready state and/or UPS running state. The output switch 60 permits disconnecting the UPS 40 from the load when it is being supplied via the bypass switch 56 to allow maintenance of the UPS 40.

The UPS 40 further includes a plurality of storage modules 62, e.g., battery modules that may consist of multiple coupled batteries. Each storage module 62 includes a charger module 64 and an alternating current (AC) inverter 66. An isolation transformer 68 and AC capacitors 70 couple the battery modules 62 to the load 50 via the output switch 60. The system control 72 may be a purpose based processing device or a general purpose microprocessor programmed to control the operation of the UPS 40 in the manner herein described. The system control 72 is coupled to the PES 46, the switchgear 54, the modules 62 and, if included, the backup generator 42 and utility transfer switch 44. For prolonged outages, e.g., outages exceeding 30-60 seconds in duration, the system control 72 may transfer power supple to the load 50 from the modules 62 to the backup generator 42 via the transfer switch 44. Generally, the PES 46 and the system control 72 operate to within ¼ cycle of detection of a source power disturbance to transfer the load 50 from the utility source 48 to the storage modules 62. Furthermore, upon resumption of normal source power, the system control 72 is operable to transfer the load 50 from the storage modules 62 to the utility source 48, after suitable synchronization, by closing the PES 46.

Generally, the system control 72 synchronizes the power provided by the storage modules 62 with the utility source power. That is, the power provided by the UPS is synchronized to closely match the normal source power curve. However, in accordance with an embodiment of the invention, in the event of a source power disturbance that may lead to a load anomaly, e.g., a voltage sag, the system control 72 may direct the storage module to provide power in accordance with an alternate modified curve. For example, the power may be provide at a predetermined level, e.g., voltage, for a predetermined duration to cause the UPS supplied power curve to depart from normal supply curve post disruption detection. The duration of the departure is sufficiently long to correct for an anomaly that may result in the load as a result of the source disruption. Following the predetermined duration, the UPS supplied power curve is conformed to the normal supply curve until restoration of the source voltage or engagement of a secondary power source. This is illustrated in example shown in FIG. 3.

Figure 3:
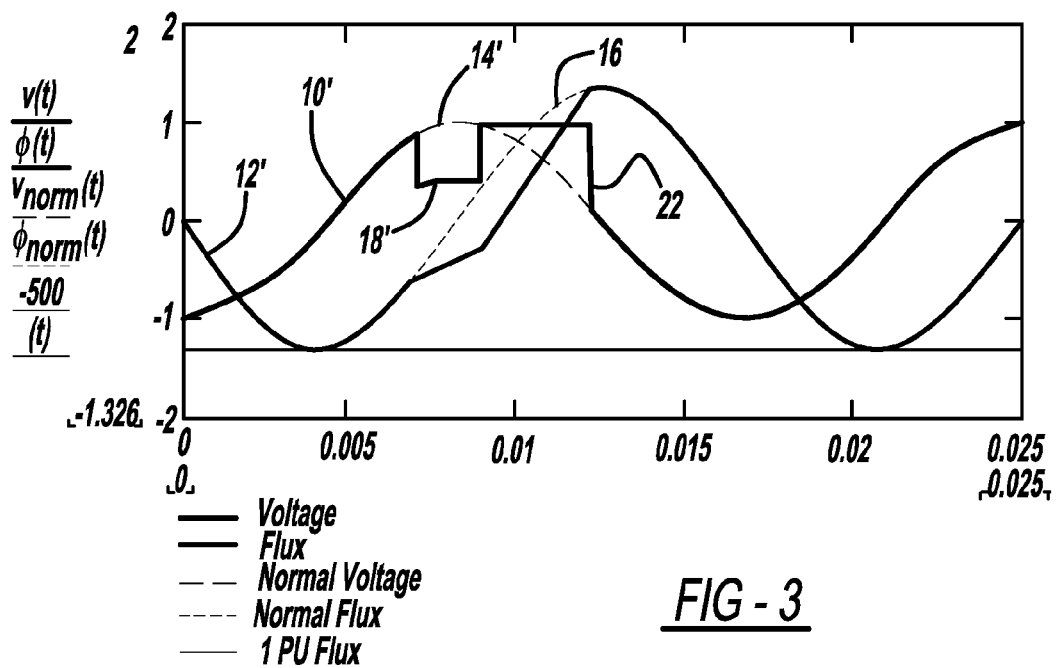
FIG. 3 is a graph depicting supply voltage and corresponding transformer flux for a UPS system and control in accordance with a preferred embodiment of the invention.

The curves of FIG. 3 are designated with primed reference numerals corresponding to the curves illustrated in FIG. 1. As shown in both FIGS. 1 and 3, a source disruption, voltage sag 18' of approximately 2 ms duration and of about 40% of the source voltage occurs at 7 ms. At about 9 ms, the system control 72 has transferred the load from the utility source 48 to the UPS 40. However, the profile of the UPS supplied power does not follow the source supply curve. As shown for the example of FIG. 3, an over voltage 22 is supplied and the UPS supplied voltage departs from the normal voltage 14'. That is, the UPS supplied power departs from the expected normal supply curve a predetermined amount and for a predetermined time period. In the example depicted in FIG. 3, the UPS supplied voltage is pegged at the maximum output voltage for a period sufficient to drive the flux in the downstream transformers to that of the normal flux curve. Thereafter, the UPS supplied voltage follows the normal voltage curve 14'.

The duration of the over voltage 22 may be based upon a predefined value or table of values for various voltage sag magnitudes and durations. Alternatively, the duration of the over voltage 22 may be determinable by the system control 72. For example, the system control 72 may be configured to integrate the voltage of the UPS output bus at each voltage zero. If the UPS 40 is called upon to run in a particular voltage loop, the calculated volt-seconds, which is proportional to transformer flux, is compared to a stored reference value. If the difference is within a defined tolerance, the UPS supplied voltage follows the normal/reference voltage curve 14'. If the calculated volt-seconds is more than the tolerance value less than or greater than the reference value, the UPS supplied voltage is set to the maximum positive or the maximum negative, respectively for a duration sufficient to drive the flux in the downstream transformers to that of the normal flux curve. That is, the over or full output voltage continues until the difference between the calculated volt-seconds and the stored reference is within the defined tolerance. Thereafter, the UPS supplied voltage returns to the normal voltage profile.

It will be appreciated that the departure from the normal supply curve does not need to be at the maximum output power, positive or negative, but it may be at intermediate values. Furthermore, the departure from the normal supply curve does not have to be a constant or uniform value, such as depicted in FIG. 3, but it may vary with time. The departure should be of sufficient magnitude and duration to correct any anomalies that may develop in the load.

The invention has been described in terms of several embodiments, including a number of features and functions. Not all features and functions are required for every embodiment of the invention, and in this manner the invention provides a UPS system and a method of controlling a UPS that in addition to providing seamless stable power to various load applications further prevent load anomalies as a result of power supply variations. The features discussed herein are intended to be illustrative of those features that may be implemented; however, such features should not be considered exhaustive of all possible features that may be implemented in a device configured in accordance with the embodiments of the invention. Moreover, the herein described embodiments are illustrative, not limiting of the invention. The invention is defined and limited only by the following claims.

The invention claimed is:

1. An uninterruptible power supply comprising:
a stored power supply;
a controllable switch for switching a load between a source power supply and a supply of power from the stored power supply via a controller; and
the controller for controlling operation of the controllable switch and the supply of power from the stored power supply, wherein the controller is operable to cause an output supply of power from the uninterruptible power supply that is supplied from the stored power supply via the controllable switch following detection of a disruption in the source power supply causing a load transformer current in-rush anomaly, the output supply of power having a profile and value to offset the transformer current in-rush anomaly.

2. The uninterruptible power supply of claim 1, wherein the output supply of power comprises a maximum voltage output of the stored power supply.

3. The uninterruptible power supply of claim 1, wherein the output supply of power comprises a maximum voltage value of the source power supply.

4. The uninterruptible power supply of claim 1, wherein the duration is determined based upon a measured characteristic of one of the source power supply and the stored power supply.

5. The uninterruptible power supple of claim 1, wherein the profile of the normally supplied profile of the source power supply is a sinusoid and the profile of the output supply of power is non-sinusoidal.

6. The uninterruptible power supple of claim 5, wherein the profile of the output supply of power has a linear portion.

* * * * *